(12) United States Patent
Duckett, III

(10) Patent No.: US 8,724,236 B2
(45) Date of Patent: May 13, 2014

(54) OBJECTIVE LENS DESIGN FOR MINIATURE ENDOSCOPE

(75) Inventor: George E. Duckett, III, Castaic, CA (US)

(73) Assignee: Karl Storz Imaging, Inc., Goleta, CA (US)

( * ) Notice: Subject to any disclaimer, the term of this patent is extended or adjusted under 35 U.S.C. 154(b) by 15 days.

(21) Appl. No.: 12/951,916

(22) Filed: Nov. 22, 2010

(65) Prior Publication Data

US 2011/0069400 A1    Mar. 24, 2011

Related U.S. Application Data

(62) Division of application No. 11/735,198, filed on Apr. 13, 2007, now Pat. No. 7,869,140.

(51) Int. Cl.
*G02B 13/04* (2006.01)

(52) U.S. Cl.
USPC .......................................................... 359/753

(58) Field of Classification Search
USPC ........................................... 359/753–754, 749
See application file for complete search history.

(56) References Cited

U.S. PATENT DOCUMENTS

| | | | |
|---|---|---|---|
| 2,913,957 A | 11/1959 | Back | |
| 3,918,072 A * | 11/1975 | Imai et al. | 396/17 |
| 4,721,372 A | 1/1988 | Yokota | |
| 4,858,002 A | 8/1989 | Zobel | |
| 4,984,878 A | 1/1991 | Miyano | |
| 4,987,884 A * | 1/1991 | Nishioka et al. | 600/181 |
| 5,005,957 A | 4/1991 | Kanamori et al. | |
| 6,038,079 A | 3/2000 | Michaels | |
| 6,134,056 A | 10/2000 | Nakamuka | |
| 6,323,934 B1 | 11/2001 | Enomoto | |
| 6,327,101 B1 | 12/2001 | Miyano | |
| 6,618,207 B2 | 9/2003 | Lei | |
| 6,994,668 B2 * | 2/2006 | Miyano | 600/176 |
| 7,027,231 B2 | 4/2006 | Miyano | |
| 2002/0027723 A1 * | 3/2002 | Lei | 359/691 |
| 2002/0161278 A1 * | 10/2002 | Nakamura | 600/111 |
| 2008/0166043 A1 * | 7/2008 | Bassi et al. | 382/167 |

FOREIGN PATENT DOCUMENTS

| | | |
|---|---|---|
| EP | 1008882 A1 | 6/2000 |
| EP | 1526398 A1 | 4/2005 |
| JP | 2001174712 A | 6/2001 |
| JP | 2001520399 T | 10/2001 |
| WO | 9906866 A1 | 2/1999 |
| WO | 9919752 A1 | 4/1999 |

OTHER PUBLICATIONS

Extended European Search Report, EP 08006212, Oct. 9, 2008, 6 pages.
European Search Report; Application No. EP 11 15 8342; Apr. 12, 2011; 6 pages.

* cited by examiner

*Primary Examiner* — James Greece
(74) *Attorney, Agent, or Firm* — St. Onge Steward Johnston & Reens LLC

(57) ABSTRACT

An endoscope objective lens system design is disclosed, generally comprising a first lens group having overall negative refractive power, a second lens group having overall positive refractive power, and an aperture diaphragm disposed between the first and second lens groups wherein the first lens group includes a plano-concave lens with its concave surface facing the objective end of the endoscope.

13 Claims, 3 Drawing Sheets

OBJECTIVE LENS DESIGN FOR MINIATURE ENDOSCOPE

CROSS-REFERENCE TO RELATED APPLICATIONS

This application is a divisional of allowed U.S. patent application Ser. No. 11/735,198 filed Apr. 13, 2007 now U.S. Pat. No. 7,869,140, the content of which is incorporated herein by reference.

FIELD OF THE INVENTION

This invention relates to an objective lens arrangement which can be utilized as an objective lens in an endoscope.

BACKGROUND OF THE INVENTION

Endoscopes generally include a series of lenses used to convey an image of the scene to be viewed from a distal end of the endoscope to a proximal end, where the image may be observed by the user, captured by an image sensor, recorded by a video camera, and/or processed by electronic means. (Throughout this application, the "distal" end of the endoscope will refer to the objective end, while the "proximal" end will refer to the image end.) It is well known in the art that objective lens systems in endoscopes often include two lens groups separated by an aperture diaphragm. As disclosed in U.S. Pat. No. 5,005,957 to Kanamori et al. and U.S. Pat. No. 6,618,207 to Lei, the first lens group has an overall negative refractive power while the second lens group has an overall positive refractive power. This well-known optical design form of endoscope objective lens systems is referred to as reverse telephoto.

An endoscope objective lens arrangement 10 of the reverse telephoto type can be seen in FIG. 1. Lens arrangement 10 has a first lens group 11 having an overall negative refractive power nearest the distal end 14 of the endoscope, a second lens group 12 having an overall positive refractive power nearer to the proximal end 18 of the endoscope, an aperture diaphragm 13 situated between said first lens group 11 and said second lens group 12, and an image capture device 25. First lens group 11 contains lens element 16 having a negative refractive power. Lens element 16 is situated so that its concave surface 19 faces the aperture diaphragm 13 and the proximal end of the endoscope 18. First lens group 11 also contains cover glass 15, which acts as a barrier between the optical system and the environment external to the endoscope.

Endoscopes are intended to be used in minimally invasive surgical techniques, such as laparoscopy, hysteroscopy, and colonoscopy. As a result, it is desirable to reduce the size of the endoscope as much as possible in order to limit the stress on a surgical patient's body tissues. The most important dimension of the endoscope for these purposes is its outside diameter, which is substantially limited by the diameter of the lenses inside the endoscope. Therefore, reducing the size of the endoscope is best achieved by reducing the diameter of the lenses.

One advantage of the reverse telephoto configuration is that it allows for a relatively large field of view for an endoscope of small diameter. To obtain a large field of view, reverse telephoto designs generally employ one or more negative refractive power lens surfaces in the first lens group. Negative refractive power lens surfaces having their concave surfaces facing the aperture diaphragm usually provide most of the negative power of the first lens group which has an overall negative power. In many endoscopes, the first lens group is a single negative power lens with its concave surface facing the aperture diaphragm.

As stated above, because of the intended application of endoscopes, it is desirable to reduce the diameter of the lenses as much as possible. Unfortunately, as a lens's diameter is reduced, its refractive power must be increased in order to maintain the size of the lens's field of view. As the diameter is reduced and the lens gets smaller, it becomes increasingly difficult to manufacture the curved surface of the lens. As a result, it is difficult and sometimes impossible to create a lens with a sufficiently small radius of curvature. Thus, as the lens diameter requirements become more stringent and call for a smaller lens, it becomes more difficult and sometimes impossible to manufacture the lens with sufficient power due to the difficulty of creating a small radius of curvature.

Endoscope designers are thus faced with a choice when utilizing the conventional approach to endoscope design. On one hand, the performance of the optical system may be maintained at the expense of any significant reduction of the endoscope's size. On the other hand, the endoscope may be reduced in size at the expense of optical performance. It has been discovered that simply scaling a conventional endoscope lens configuration down to a smaller size is not possible. The overall size of the endoscope and the performance of the optical system are limited by the manufacturability of the lenses.

U.S. Pat. No. 6,134,056 to Nakamuka is directed to designs of objective lens systems for endoscopes that attempt to address these problems. Nakamuka discloses objective lens systems including a negative first lens in the first lens group having a concave surface facing the distal end of the endoscope. However, each of these designs is limited by the following condition:

$$2.0 < f_3/f < 5.0$$

Where $f_3$ is the focal length of the third lens in the system and f is the overall focal length of the system. Nakamuka imposes this restriction for the stated reasons that a value of $f_3/f$ of less than 2.0 would result in a larger-than-desired diameter of the third lens and a value of $f_3/f$ of more than 5 would introduce undesirable color shading into the image. However, it has been found that designing $f_3/f$ to less than 2.0 does not require a larger diameter in the third lens while at the same time minimizing color shading in the image.

Using conventional endoscope objective lens configurations has limited the creation of miniature endoscopes which would be of great value in the field. What is desired, then, is an endoscope lens configuration design which minimizes the diameter of the lenses without sacrificing the optical performance of the system to an extent that use of the endoscope becomes impractical or undesirable. It is also desirable that this design be simple and inexpensive to implement.

SUMMARY OF THE INVENTION

Accordingly, it is an object of the present invention to provide an endoscope objective lens system design.

Another object of the present invention is to provide an endoscope objective lens system design which minimizes the diameters of the lenses therein and therefore minimizes the overall endoscope diameter.

Yet another object of the present invention is to provide an endoscope objective lens system design of minimal size without significantly sacrificing the optical performance of the endoscope.

Yet a further object of the present invention is to provide an endoscope objective lens system design which is simple and inexpensive to manufacture and implement.

These and other objects are achieved in accordance with one embodiment of the present invention by providing an endoscope objective lens arrangement comprising a first lens group having a negative refractive power and a lens in said first lens group that is plano-concave with its concave surface facing the distal end of the endoscope.

In a first embodiment of the present invention, an endoscope objective lens arrangement having an overall focal length of f comprises: a first lens group having a negative refractive power at a distal end of the endoscope; an aperture diaphragm disposed on a proximal side of the first lens group; a second lens group having a positive refractive power disposed on the proximal side of the aperture diaphragm; a first lens that is plano-concave in the first lens group with its concave surface facing the distal end of the endoscope; a second lens that is plano-convex in the second lens group disposed immediately proximal to the aperture stop; a third lens that is plano-convex in the second lens group disposed on the proximal side of the second plano-convex lens and having a focal length of $f_L$; and wherein the following condition is satisfied: $f_L/f<2.0$.

Some embodiments may further include the features that substantially all of the negative refractive power of the first lens group is provided by the first lens that is plano-concave, the first lens that is plano-concave has a radius of curvature of greater than or equal to 0.5 millimeters, and any lens in the first or second lens group has a diameter of less than or equal to 1 millimeter. Some embodiments may also include a cover glass having negligible refractive power in the first lens group. Some embodiments may further include a fourth lens and a fifth lens adapted to form a doublet to correct for lateral color aberration. In some embodiments the fourth and fifth lenses have substantially the same index of refraction but different dispersions. Some embodiments may also include electronic image processing means for correcting lateral color aberration and/or image distortion. Some embodiments may include a color correction filter or an infrared filter. Some other embodiments include a color-correcting filter and/or an infrared blocking filter disposed within the objective lens arrangement.

In a second embodiment of the present invention, an endoscope objective lens arrangement comprises: a first lens group having a negative refractive power at a distal end of the endoscope; an aperture diaphragm disposed on a proximal side of the first lens group; a second lens group having a positive refractive power disposed on the proximal side of the aperture diaphragm; a first lens in the first lens group which is plano-concave with the concave surface facing the distal end of the endoscope; a second lens and a third lens disposed in either the first lens group or the second lens group wherein the second and third lenses are adapted to form a doublet.

In some embodiments, the first lens provides substantially all of the negative refractive power of the first lens group. In some embodiments, any lens in the first or second lens group has a diameter of less than or equal to 1 millimeter. In some embodiments, the curved surface of the first lens has a radius of curvature of greater than or equal to 0.5 millimeters. In some embodiments, the first lens group includes a cover glass having negligible refractive power. In some embodiments, the second lens and the third lens have substantially the same index of refraction but different dispersions. In some embodiments, the doublet is adapted to correct lateral color aberration. In other embodiments, lateral color aberration and/or image distortion is corrected by an electronic image processing means. In some embodiments, the second lens group comprises a plano-convex positive lens element adjacent to the aperture stop with its convex surface facing the proximal end of the endoscope followed by a plano-convex element with its convex surface facing the distal end of the endoscope. In some embodiments, a distal-facing surface of the second lens and a proximal-facing surface of the third lens are planar. In some embodiments, a color-correcting filter and/or an infrared filter is disposed within the objective lens arrangement.

In a third embodiment of the present invention an endoscope objective lens arrangement comprises, in order from a distal end of an endoscope: a cover glass; a first lens that is plano-concave with its concave surface facing the distal end of the endoscope; an aperture diaphragm; a second lens that is plano-convex with its convex surface facing a proximal end of the endoscope; and a third lens and a fourth lens adapted to form a doublet.

In some embodiments, any lens in said objective lens arrangement has a diameter of less than or equal to 1 millimeter. In some embodiments, the curved surface of the first lens has a radius of curvature of greater than or equal to 0.5 millimeters. In some embodiments, the third lens and the fourth lens have substantially the same index of refraction but different dispersions. In some embodiments, the doublet is adapted to correct lateral color aberration. In some embodiments, a distal-facing surface of the third lens and/or a proximal-facing surface of the second lens are planar. In some embodiments, lateral color aberration and/or image distortion is corrected by an electronic image processing means. In some embodiments, a color-correcting filter and/or an infrared filter is disposed at a selected location in the objective lens arrangement.

The invention and its particular advantages and features will become more apparent from the following detailed description considered with reference to the accompanying drawings.

BRIEF DESCRIPTION OF THE DRAWINGS

In the following drawings, the invention is demonstrated without restricting its general inventive concept by means of the models shown. The illustrations are as follows.

DETAILED DESCRIPTION OF THE INVENTION

Figure 1:
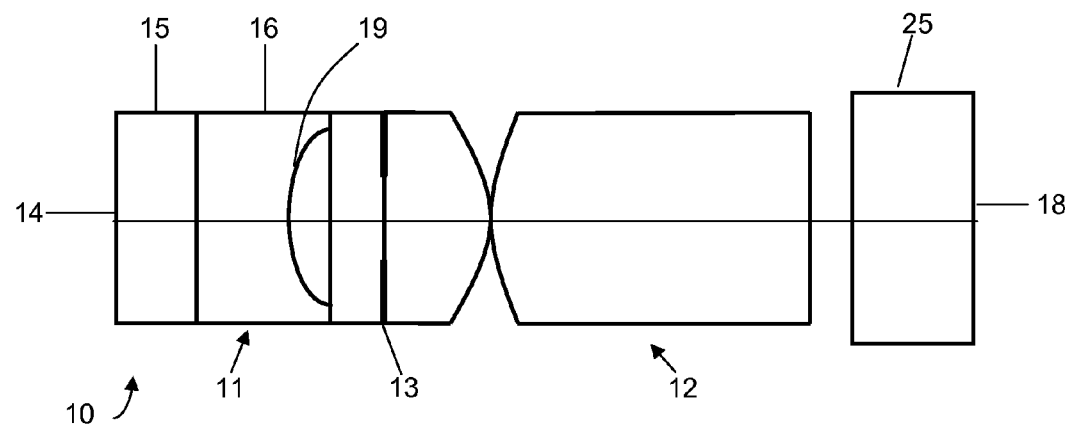
FIG. 1 shows a conventional endoscope objective lens arrangement as found in the prior art.
Figure 2:
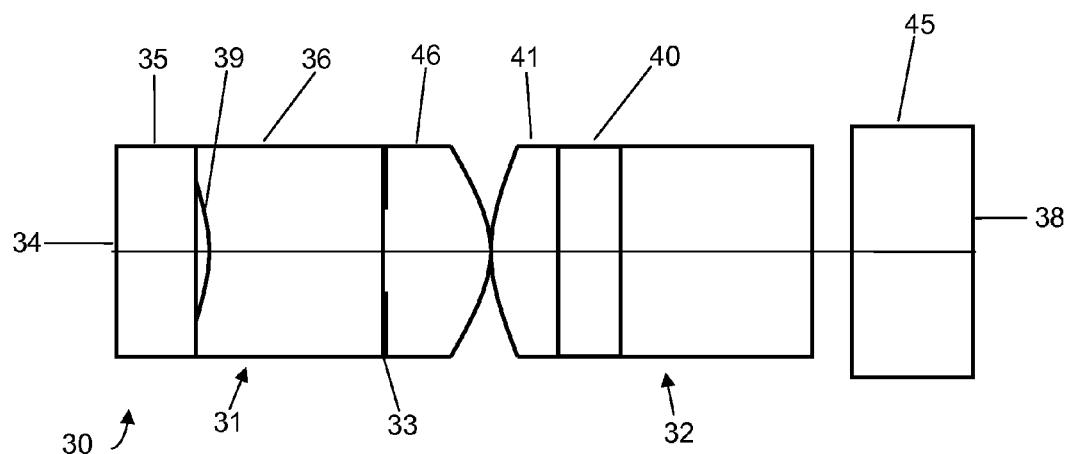
FIG. 2 shows a first embodiment of the present invention.

Referring now to FIG. 2, an endoscope objective lens arrangement 30 having an overall focal length of f according to the present invention is shown. Like the endoscope objective lens arrangement 10 shown in FIG. 1, the objective lens arrangement 30 has a first lens group 31 nearest the distal end 34 of the endoscope with an overall negative refractive power, a second lens group 32 nearer to the proximal end 38 of the endoscope with an overall positive refractive power, an aperture diaphragm 33 between the first lens group 31 and the second lens group 32, and an image capture device 45.

The first lens group 31 includes a plano-concave lens 36. Lens 36 is positioned such that the curved surface 39 of lens 36 faces the distal end 34 of the endoscope. First lens group 31 also includes cover glass 35 at the distal end 34 of the endoscope and serves to separate the optical components of the endoscope from the external environment. In the embodiment shown in FIG. 2, lens 36 is responsible for all of the negative refractive power of first lens group 31. It should be noted that in other embodiments the first lens group could include other optical elements with either positive or negative refractive power.

The second lens group 32 includes plano-convex lens 46 immediately proximal to the aperture stop 33 and a second plano-convex lens 41 the convex surface of which faces the distal end 34 of the endoscope and which has focal length $f_L$. Lens 41 is designed such that $f_L/f$ will be less than 2.0. As stated above, this parameter allows for significant reduction of color shading in the image while not increasing the diameters of the lenses. The endoscope objective lens arrangement 30 also contains a filter 40 for color correction and/or the reduction of infrared transmission. The filter 40 is shown in the second lens group but could also be disposed in the first lens group in other embodiments, or may be not be present at all in other embodiments.

Figure 3:
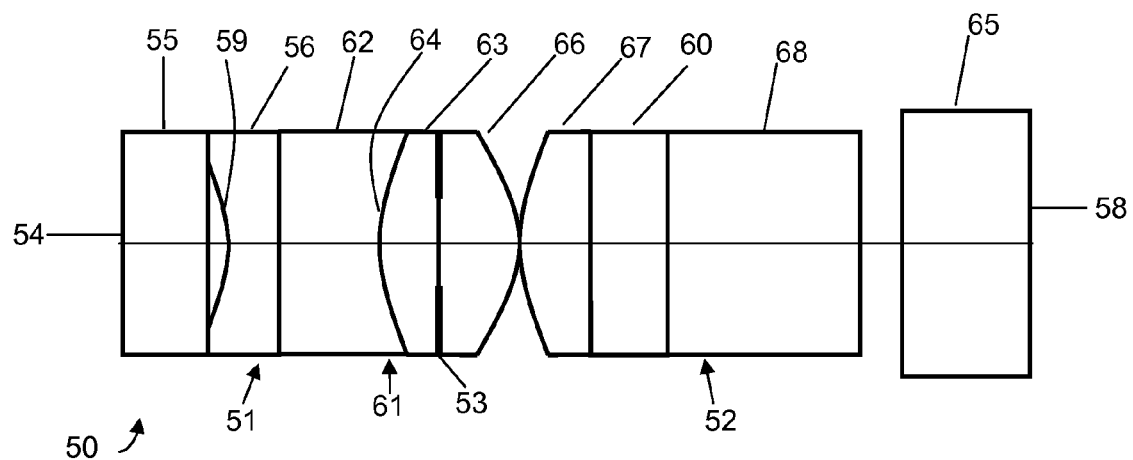
FIG. 3 shows a second embodiment of the present invention.

FIG. 3 shows a second embodiment of the present invention. Like the first embodiment shown in FIG. 2, the endoscope objective lens arrangement 50 has a first lens group 51 at a distal end 54 with an overall negative refractive power, a second lens group 52 at a proximal end 58 with an overall positive refractive power, an aperture diaphragm 53 that separates the two lens groups, and an image capture device 65.

The first lens group 51 in lens arrangement 50 includes a plano-concave lens 56 having negative refractive power, the concave surface of which faces the distal end 54 of the endoscope. In this embodiment, the first lens group 51 also includes a doublet 61 which consists of two lenses 62 and 63. The doublet 61 has interface 64 where lenses 62 and 63 are in contact. The doublet 61 has a primary purpose of correcting lateral color aberration, and may correct other aberrations of the optical system. The lenses 62 and 63 may be composed of two different materials having substantially the same index of refraction but different dispersions. Lenses 62 and 63 may be constructed such that their surfaces opposite to interface 64 are either curved or planar. In some embodiments surface 64 may be concave to the distal end of the endoscope 54, while in other embodiments it may be convex to the distal end 54.

The second lens group 52 has an overall positive refractive power nearer to the proximal end 58 of the endoscope. The second embodiment also includes a cover glass 55 at the distal end 54 of the endoscope that again serves to separate the optical components of the endoscope from the external environment. The endoscope objective lens arrangement 50 also contains a filter 60 for color correction and/or the reduction of infrared transmission. The filter 60 is shown in the second lens group but could also be disposed in the first lens group in other embodiments, or may not be present at all in other embodiments. In the embodiment shown in FIG. 3, the second lens group also includes additional components 66, 67, and 68.

Figure 4:
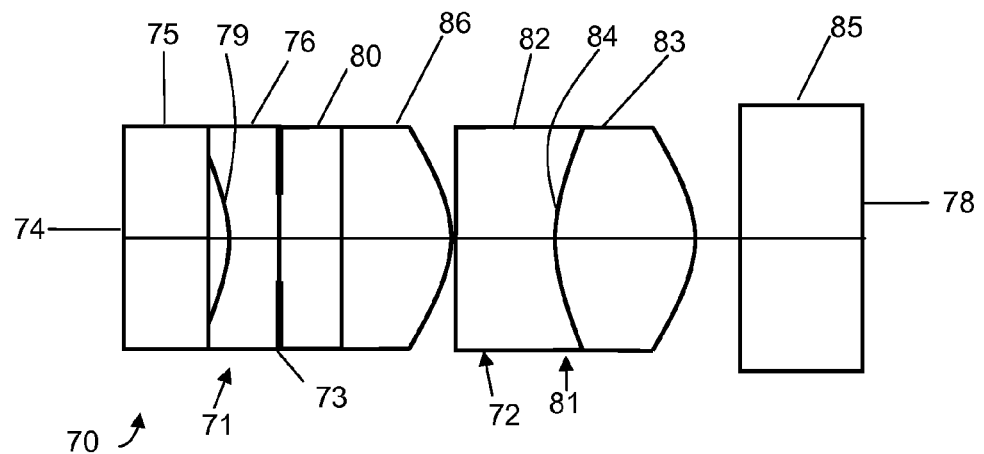
FIG. 4 shows a third embodiment of the present invention.

Referring now to FIG. 4, a third embodiment of the present invention is shown. The objective lens arrangement 70 has a first lens group 71 at a distal end 74 with an overall negative refractive power, a second lens group 72 at a proximal end 78 with an overall positive refractive power, an aperture diaphragm 73 that separates the two lens groups, and an image capture device 85.

The first lens group 71 in lens arrangement 70 includes a plano-concave lens 76 having negative refractive power, the concave surface of which faces the distal end 54 of the endoscope. In this embodiment, the second lens group 72 also includes a doublet 81 which consists of two lenses 82 and 83. In the embodiment shown in FIG. 4, the second lens group also includes an additional component 86. The doublet 81 has interface 84 where lenses 82 and 83 are in contact. The doublet 81 has a primary purpose of correcting lateral color aberration, and may correct other aberrations of the optical system. The lenses 82 and 83 may be composed of two different materials having substantially the same index of refraction but different dispersions. Lenses 82 and 83 may be constructed such that their surfaces opposite to interface 84 are either curved or planar. In some embodiments surface 84 may be concave to the distal end of the endoscope 74, while in other embodiments it may be convex to the distal end 74.

Figure 5:
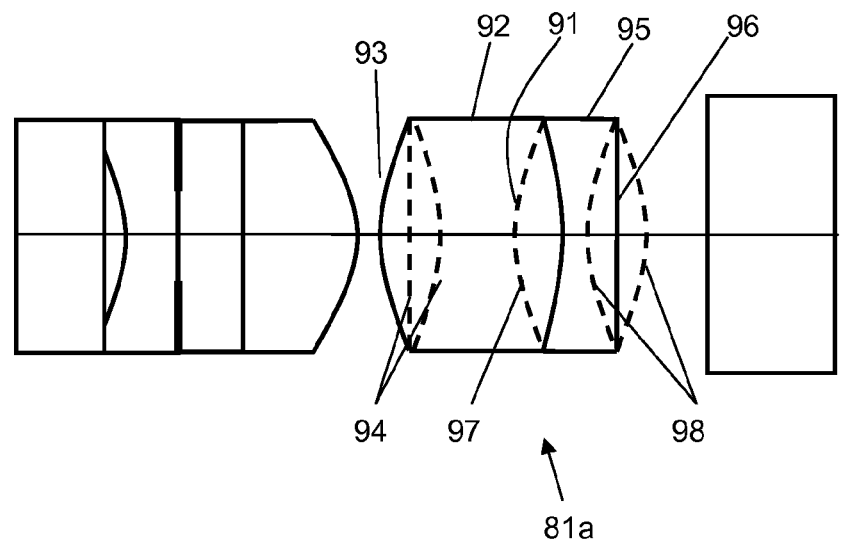
FIG. 5 shows additional configurations of the present invention.

FIG. 5 shows additional configurations of the doublet 81a in the second lens group. The surface 93 of lens 92 is curved to the distal end, while the surface 91 is curved to the proximal end. The lens 95 has a curved surface on its distal side that corresponds to the surface 91 of the lens 92, and a planar proximal surface 96. The dashed lines 94 represent alternative configurations for the surface 93. The dashed line 97 represents the alternative configuration for surface 91. The dashed lines 98 represent the alternative configuration for surface 96.

The third embodiment also includes a cover glass 75 at the distal end 74 of the endoscope and again serves to separate the optical components of the endoscope from the external environment. The endoscope objective lens arrangement 70 also contains a filter 80 for color correction and/or the reduction of infrared transmission. The filter 80 is shown in the first lens group but could also be disposed various locations within lens arrangement 70 in other embodiments, or may not be present in other embodiments.

The present invention is advantageously employed in endoscopes having a small size. An objective lens system according to the present invention could be employed in an endoscope wherein the diameter of the largest lens in the system is 1 millimeter or less. In such a system, the present invention allows for the curved surface 39, 59, or 79 of the plano-concave lens 36, 56, or 76 in either the first lens group 31, 51, or 71 to have a radius of curvature of 0.5 millimeters or greater.

As described in U.S. Pat. No. 6,618,207 to Lei, the images generated by endoscopes are often distorted. Images generated by endoscopes can also suffer from lateral color aberration, wherein the red and blue colors of an image become separated because of the different refractive tendencies of red and blue light. This may also be the case in endoscopes that utilize the present invention. Generally, the lateral color aberration and/or distortion generated in an objective lens arrangement according to the present invention can be partly or fully corrected using electronic image processing means. Such electronic image processing is generally done by a computer or electronic processor integral to the endoscope system which receives the image from the endoscope, processes the image to correct for distortion, and then displays the corrected image on a monitor.

Although the invention has been described with reference to a particular arrangement of parts, features and the like, these are not intended to exhaust all possible arrangements or features, and indeed many other modifications and variations will be ascertainable to those of skill in the art. Accordingly, reference should be made primarily to the accompanying claims, rather than the foregoing specification, to determine the scope of the invention.

What is claimed is:

1. An endoscope objective lens arrangement, comprising, in order from a distal end of an endoscope:

a cover glass;

a first lens that is plano-concave, which is the distal-most lens in the arrangement, with its concave surface facing the distal end of the endoscope;

an aperture diaphragm;

a second lens that is plano-convex, with its convex surface facing a proximal end of the endoscope;

a third lens and a fourth lens adapted to form a doublet;

wherein at least one of the distal-facing surface of said third lens and the proximal-facing surface of said fourth lens is planar; and wherein at least one of the proximal-facing surface of said third lens and the distal-facing surface of said fourth lens is either convex or concave.

2. The endoscope objective lens arrangement according to claim 1 wherein any lens in said objective lens arrangement has a diameter of less than or equal to 1 millimeter.

3. The endoscope objective lens arrangement according to claim 1 wherein the curved surface of said first lens has a radius of curvature of greater than or equal to 0.5 millimeters.

4. The endoscope objective lens arrangement according to claim 1 wherein said third lens and said fourth lens have substantially the same index of refraction but different dispersions.

5. The endoscope objective lens arrangement according to claim 1 wherein said doublet is adapted to correct lateral color aberration.

6. The endoscope objective lens arrangement according to claim 1 wherein lateral color aberration is corrected by an electronic image processing means.

7. The endoscope objective lens arrangement according to claim 1 wherein image distortion is corrected by an electronic image processing means.

8. The endoscope objective lens arrangement according to claim 1 wherein a color-correcting filter is disposed between said aperture diaphragm and said second lens.

9. The endoscope objective lens arrangement according to claim 1 wherein an infrared filter is disposed at a selected location therein.

10. The endoscope objective lens arrangement according to claim 1, wherein the distal-facing surface of said third lens is planar.

11. The endoscope objective lens arrangement according to claim 10, wherein the proximal-facing surface of said third lens is concave.

12. The endoscope objective lens arrangement according to claim 10, wherein the proximal-facing surface of said third lens is convex.

13. The endoscope objective lens arrangement according to claim 11, wherein the proximal-facing surface of said fourth lens is convex.

* * * * *